United States Patent
Kim et al.

(10) Patent No.: US 10,728,461 B1
(45) Date of Patent: Jul. 28, 2020

(54) METHOD FOR CORRECTING MISALIGNMENT OF CAMERA BY SELECTIVELY USING INFORMATION GENERATED BY ITSELF AND INFORMATION GENERATED BY OTHER ENTITIES AND DEVICE USING THE SAME

(71) Applicant: Stradvision, Inc., Pohang-si, Gyeongsangbuk-do (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/740,165

(22) Filed: Jan. 10, 2020

Related U.S. Application Data

(60) Provisional application No. 62/799,386, filed on Jan. 31, 2019.

(51) Int. Cl.
*G06K 9/00* (2006.01)
*H04N 5/232* (2006.01)
*G06T 7/73* (2017.01)
*G06N 3/04* (2006.01)

(52) U.S. Cl.
CPC ....... *H04N 5/23299* (2018.08); *G06N 3/0454* (2013.01); *G06T 7/74* (2017.01); *G06T 2207/20084* (2013.01); *G06T 2207/30256* (2013.01)

(58) Field of Classification Search
CPC .... H04N 5/23299; G06N 3/0454; G06T 7/74; G06T 2207/20084; G06T 2207/30256
See application file for complete search history.

(56) References Cited

U.S. PATENT DOCUMENTS

| | | | | |
|---|---|---|---|---|
| 7,706,978 | B2 * | 4/2010 | Schiffmann | G01S 13/867 |
| | | | | 701/301 |
| 7,774,113 | B2 * | 8/2010 | Oyaide | G01C 21/26 |
| | | | | 348/118 |
| 10,298,910 | B1 * | 5/2019 | Kroeger | H04N 13/246 |

(Continued)

*Primary Examiner* — Aaron W Carter
(74) *Attorney, Agent, or Firm* — Kaplan Breyer Schwarz, LLP

(57) ABSTRACT

A method for correcting an incorrect angle of a camera is provided. And the method includes steps of: (a) a computing device, generating first reference data or second reference data according to circumstance information by referring to a reference image; (b) the computing device generating a first angle error or a second angle error by referring to the first reference data or the second reference data with vehicle coordinate data; and (c) the computing device instructing a physical rotation module to adjust the incorrect angle by referring to the first angle error or the second angle error.

18 Claims, 4 Drawing Sheets

(56) References Cited

U.S. PATENT DOCUMENTS

| | | | |
|---|---|---|---|
| 10,503,174 B1* | 12/2019 | Kim | G01S 13/931 |
| 2014/0088830 A1* | 3/2014 | Roh | B62D 6/00 |
| | | | 701/41 |
| 2014/0118552 A1* | 5/2014 | Takahama | G06K 9/00798 |
| | | | 348/148 |
| 2014/0340518 A1* | 11/2014 | Kambe | G06K 9/00791 |
| | | | 348/148 |
| 2019/0108651 A1* | 4/2019 | Gu | G06T 7/80 |
| 2019/0163990 A1* | 5/2019 | Mei | G06K 9/00798 |
| 2019/0206084 A1* | 7/2019 | Noble | G06T 7/80 |
| 2020/0005489 A1* | 1/2020 | Kroeger | G06T 7/85 |
| 2020/0019165 A1* | 1/2020 | Levandowski | G05D 1/0287 |
| 2020/0033868 A1* | 1/2020 | Palanisamy | G05D 1/0221 |

* cited by examiner

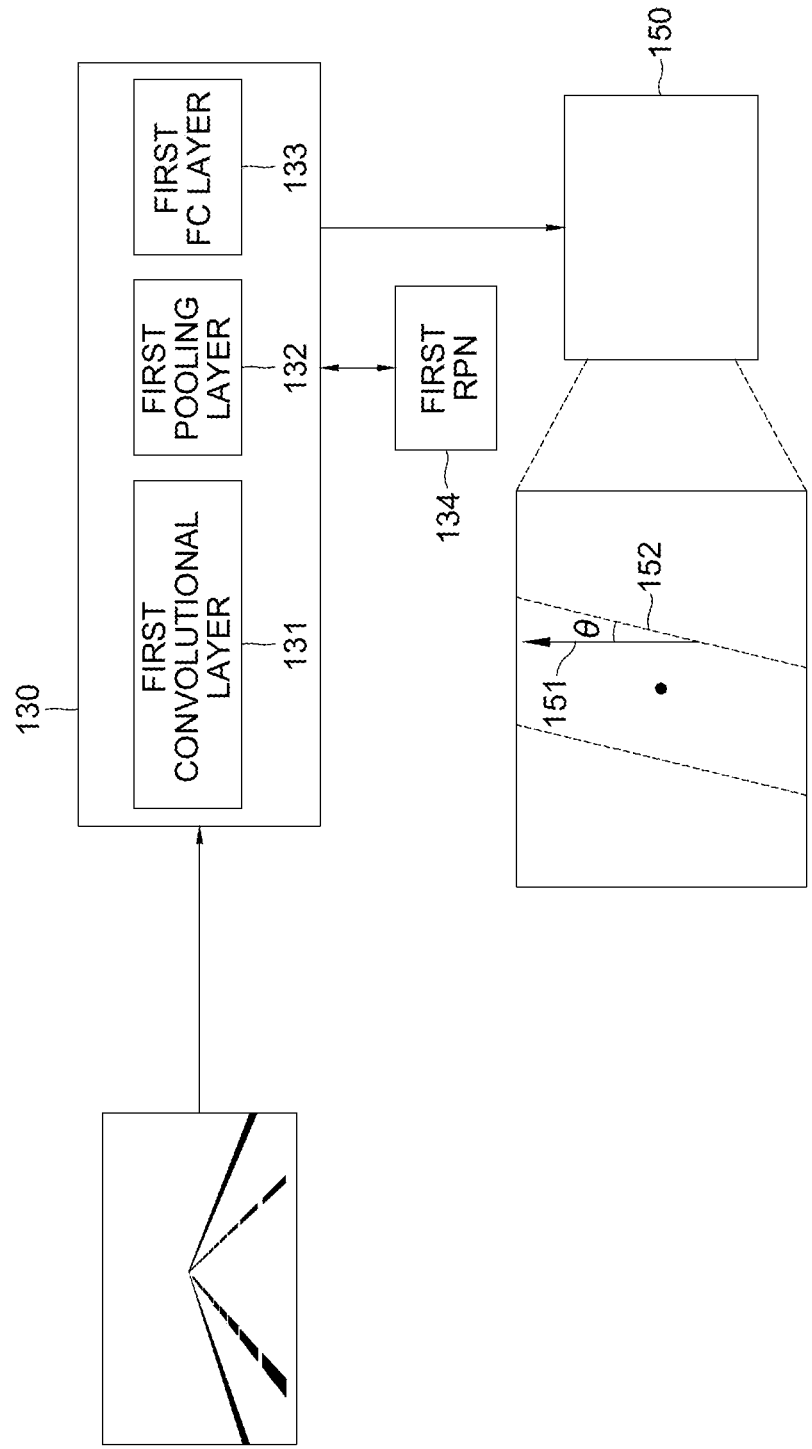

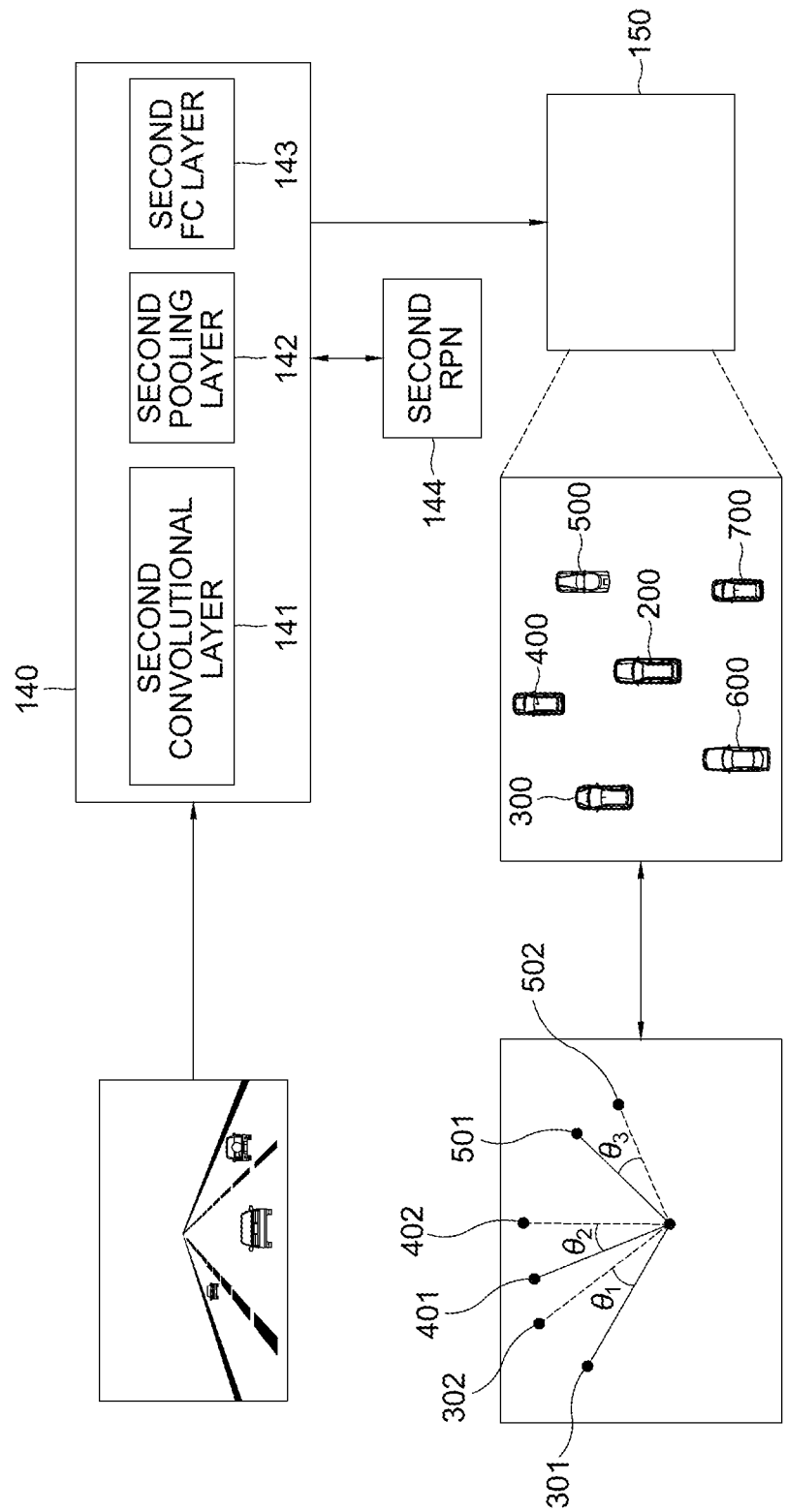

METHOD FOR CORRECTING MISALIGNMENT OF CAMERA BY SELECTIVELY USING INFORMATION GENERATED BY ITSELF AND INFORMATION GENERATED BY OTHER ENTITIES AND DEVICE USING THE SAME

CROSS REFERENCE OF RELATED APPLICATION

This application claims the benefit of priority to U.S. Provisional Patent Application No. 62/799,386, filed Jan. 31, 2019, the entire contents of which are incorporated herein by reference.

FIELD OF THE DISCLOSURE

The present disclosure relates to a method and a device for use with an autonomous vehicle; and more particularly, to the method and the device for correcting a misalignment of a camera by selectively using information generated by itself and information generated by other entities.

BACKGROUND OF THE DISCLOSURE

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of machine learning.

Recently, such CNNs are widely used in a field of an autonomous driving. In the field of the autonomous driving, the CNNs may perform an object detection, a free space detection, a semantic segmentation and the like.

The CNNs may perform those operations by processing images acquired through cameras installed on autonomous vehicles. In one example, when performing the object detection, one of the CNNs may detect locations and classes of objects included in one of the images, in a 2-dimensional coordinate system corresponding to said one of the images, and may output locations and classes of the objects in a 3-dimensional coordinate system. In the transforming process from the 2-dimensional coordinate system to the 3-dimensional coordinate system, camera parameters, which represent physical characteristics of the cameras, may be used.

A shortcoming of such approach is that if the camera parameters do not reflect real physical characteristics of the cameras, the transforming process may generate wrong outputs. Accordingly, if the physical characteristics of the cameras are changed due to external factors such as impacts on the cameras, the transforming process may not be performed properly, because a premise of the transforming process may become wrong. So far the autonomous driving has been mainly studied on a processing of the images, but methods to solve those problems were not studied much.

SUMMARY OF THE DISCLOSURE

It is an object of the present disclosure to solve all the aforementioned problems.

It is another object of the present disclosure to provide a method for detecting and adjusting a misalignment of a camera by selectively using information generated by itself and information generated by other entities, to thereby reduce dangers of autonomous driving caused by external factors.

It is still another object of the present disclosure to provide a method for integrating each pieces of said information generated by each of other vehicles to generate comparable data to be compared with the information generated by itself, to thereby correct the misalignment of the camera.

In accordance with one aspect of the present disclosure, there is provided a method for correcting an incorrect angle of an unwantedly yawed camera on a subject vehicle by using at least part of primary information generated by the subject vehicle itself and secondary information generated by other entities, wherein at least one of the primary information and the secondary information is selected by referring to circumstance information on surroundings of the subject vehicle, to be used for correcting the incorrect angle, including steps of: (a) a computing device, if at least one reference image is acquired through a camera on the subject vehicle, performing, (i) a process of instructing, if the circumstance information corresponds to a first condition related to lanes on roads, a first Convolutional Neural Network (CNN) to apply at least one first CNN operation to the reference image, to thereby generate first reference data including information on reference lanes of the reference image, and (ii) a process of instructing, if the circumstance information corresponds to a second condition related to other vehicles on the roads, a second CNN to apply at least one second CNN operation to the reference image, to thereby generate second reference data including information on one or more reference vehicles of the reference image; (b) the computing device instructing a correction module to perform (i) a process of generating, if the circumstance information corresponds to the first condition, at least one first angle error on the camera corresponding to the reference lanes by referring to the first reference data and vehicle coordinate data, and (ii) a process of generating, if the circumstance information corresponds to the second condition, at least one second angle error on the camera corresponding to the reference vehicles by referring to the second reference data and the vehicle coordinate data; and (c) the computing device instructing a physical rotation module on the subject vehicle to perform (i) a process of adjusting, if the circumstance information corresponds to the first condition, the incorrect angle by referring to the first angle error corresponding to the reference lanes and (ii) a process of adjusting, if the circumstance information corresponds to the second condition, the incorrect angle by referring to the second angle error corresponding to the reference vehicles.

As one example, at the step of (a), the computing device, if the circumstance information corresponds to the first condition, (i) instructs at least one first convolutional layer in the first CNN to apply at least one first convolutional operation to the reference image, to thereby generate at least one first reference feature map, (ii) instructs at least one first pooling layer in the first CNN to apply at least one first pooling operation to the first reference feature map, to thereby generate at least one first reference pooled feature map, and (iii) instructs at least one first Fully-Connected (FC) layer in the first CNN to apply at least one first FC operation to the first reference pooled feature map, to thereby generate detection result on the reference lanes of the reference image as the first reference data.

As one example, at the step of (b), the computing device, if the circumstance information corresponds to the first condition, instructs the correction module to (i) map the reference lanes onto a coordinate plane corresponding to the vehicle coordinate data, by referring to the vehicle coordinate data, (ii) calculate at least one first difference angle between a reference axis on the coordinate plane and at least one of the reference lanes, and (iii) output the first difference angle as the first angle error.

As one example, at the step of (a), the computing device, if the circumstance information corresponds to the second condition, (i) instructs at least one second convolutional layer in the second CNN to apply at least one second convolutional operation to the reference image, to thereby generate at least one second reference feature map, (ii) instructs at least one second pooling layer in the second CNN to apply at least one second pooling operation to the second reference feature map, to thereby generate at least one second reference pooled feature map, and (iii) instructs at least one second Fully-Connected (FC) layer in the second CNN to apply at least one second FC operation to the second reference pooled feature map, to thereby generate detection result on the reference vehicles of the reference image as the second reference data.

As one example, at the step of (a), the computing device, if the circumstance information corresponds to the second condition, in parallel with said process of generating the second reference data, acquires comparable data from one or more V2V communication vehicles located closer than a first threshold from the subject vehicle by performing wireless communications with the V2V communication vehicles, wherein K-th specific comparable data, among the comparable data, acquired from a K-th specific V2V communication vehicle among a first to an N-th specific V2V communication vehicles in the V2V communication vehicles, includes information, generated by the K-th specific V2V communication vehicle, on locations of its K-th specific surrounding vehicles located closer than a second threshold from the subject vehicle, and wherein, at the step of (b), the computing device, if the circumstance information corresponds to the second condition, instructs the correction module to (i) perform (i-1) a process of generating one or more image-based coordinates on a coordinate plane corresponding to the vehicle coordinate data representing one or more relative locations of the reference vehicles in relation to the subject vehicle by referring to the second reference data, and (i-2) a process of generating one or more communication-based coordinates on the coordinate plane representing one or more relative locations of surrounding vehicles of the V2V communication vehicles in relation to the subject vehicle by referring to the comparable data, and then to (ii) generate the second angle error by referring to the image-based coordinates and the communication-based coordinates, wherein N denotes the number of the V2V communication vehicles, and K denotes an integer from 1 to N.

As one example, at the step of (b), the computing device, if the circumstance information corresponds to the second condition, instructs the correction module, by referring to information on a Field-Of-View (FOV) of the camera and the K-th specific comparable data acquired from the K-th specific V2V communication module, to (i) map the locations of said its K-th specific surrounding vehicles estimated by the K-th specific V2V communication vehicle onto the coordinate plane, to thereby generate one or more K-th initial coordinates, and (ii) generate the communication-based coordinates of the surrounding vehicles by referring to one or more first to one or more N-th initial coordinates including the K-th initial coordinates.

As one example, at the step of (b), the computing device instructs the correction module to calculate at least one second difference angle between (i) at least one first specific direct line including at least one specific communication-based coordinate of at least one specific reference vehicle which is included in both of the reference vehicles and the surrounding vehicles, and an origin point of the coordinate plane and (ii) at least one second specific direct line including at least one specific image-based coordinate of at least one specific reference vehicle and the origin point of the coordinate plane, and output the second difference angle as the second angle error.

As one example, at the step of (b), the computing device, if there are a plurality of (i) specific reference vehicles included in both of the reference vehicles and the surrounding vehicles, (ii) specific image-based coordinates corresponding to the specific reference vehicles and (iii) specific communication-based coordinates corresponding to the specific reference vehicles, generates the second angle error by referring to a following formula:

$$\text{second angle error} = \frac{1}{M}\sum_{k}^{M} \alpha_k \sin^{-1}\left(\frac{x_{i_k} y_{c_k} - y_{i_k} x_{c_k}}{\|(x_{i_k}, y_{i_k})\|\|(x_{c_k}, y_{c_k})\|}\right)$$

wherein M denotes the number of the specific reference vehicles, $(x_{i_k}, y_{i_k})$ denotes a K-th specific image-based coordinate of a K-th specific reference vehicle, $(x_{c_k}, y_{c_k})$ denotes a K-th specific communication-based coordinate thereof, and $\alpha_k$ denotes a weight assigned thereto.

As one example, at the step of (a), the computing device, if driving information of the subject vehicle is acquired from a Controller Area Network (CAN) of the subject vehicle, determines whether the driving information corresponds to a condition A for a straight driving or a condition B for a non-straight driving, and instructs the first CNN or the second CNN to apply the first CNN operation or the second CNN operation to the reference image if the driving information corresponds to the condition A.

In accordance with another aspect of the present disclosure, there is provided a computing device for correcting an incorrect angle of an unwantedly yawed camera on a subject vehicle by using at least part of primary information generated by the subject vehicle itself and secondary information generated by other entities, wherein at least one of the primary information and the secondary information is selected by referring to circumstance information on surroundings of the subject vehicle, to be used for correcting the incorrect angle, including: at least one memory that stores instructions; and at least one processor configured to execute the instructions to perform processes of: (I) if at least one reference image is acquired through a camera on the subject vehicle, performing, instructing, if the circumstance information corresponds to a first condition related to lanes on roads, a first Convolutional Neural Network (CNN) to apply at least one first CNN operation to the reference image, to thereby generate first reference data including information on reference lanes of the reference image, and instructing, if the circumstance information corresponds to a second condition related to other vehicles on the roads, a second CNN to apply at least one second CNN operation to the reference image, to thereby generate second reference data including information on one or more reference vehicles of the reference image; (II) instructing an correction module to generate, if the circumstance information corresponds to the first condition, at least one first angle error on the camera corresponding to the reference lanes by referring to the first reference data and vehicle coordinate data, and generate, if the circumstance information corresponds to the second condition, at least one second angle error on the camera corresponding to the reference vehicles by referring to the second reference data and the vehicle coordinate data; and (III) instructing a physical rotation module on the subject vehicle to adjust, if the circumstance information corresponds to the first condition, the incorrect angle by referring to the first angle error corresponding to the reference lanes and adjust, if the circumstance information corresponds to the second condition, the incorrect angle by referring to the second angle error corresponding to the reference vehicles.

As one example, at the process of (I), the processor, if the circumstance information corresponds to the first condition, (i) instructs at least one first convolutional layer in the first CNN to apply at least one first convolutional operation to the reference image, to thereby generate at least one first reference feature map, (ii) instructs at least one first pooling layer in the first CNN to apply at least one first pooling operation to the first reference feature map, to thereby generate at least one first reference pooled feature map, and (iii) instructs at least one first Fully-Connected (FC) layer in the first CNN to apply at least one first FC operation to the first reference pooled feature map, to thereby generate detection result on the reference lanes of the reference image as the first reference data.

As one example, at the process of (II), the processor, if the circumstance information corresponds to the first condition, instructs the correction module to (i) map the reference lanes onto a coordinate plane corresponding to the vehicle coordinate data, by referring to the vehicle coordinate data, (ii) calculate at least one first difference angle between a reference axis on the coordinate plane and at least one of the reference lanes, and (iii) output the first difference angle as the first angle error.

As one example, at the process of (I), the processor, if the circumstance information corresponds to the second condition, (i) instructs at least one second convolutional layer in the second CNN to apply at least one second convolutional operation to the reference image, to thereby generate at least one second reference feature map, (ii) instructs at least one second pooling layer in the second CNN to apply at least one second pooling operation to the second reference feature map, to thereby generate at least one second reference pooled feature map, and (iii) instructs at least one second Fully-Connected (FC) layer in the second CNN to apply at least one second FC operation to the second reference pooled feature map, to thereby generate detection result on the reference vehicles of the reference image as the second reference data.

As one example, at the process of (I), the processor, if the circumstance information corresponds to the second condition, in parallel with said process of generating the second reference data, acquires comparable data from one or more V2V communication vehicles located closer than a first threshold from the subject vehicle by performing wireless communications with the V2V communication vehicles, wherein K-th specific comparable data, among the comparable data, acquired from a K-th specific V2V communication vehicle among a first to an N-th specific V2V communication vehicles in the V2V communication vehicles, includes information, generated by the K-th specific V2V communication vehicle, on locations of its K-th specific surrounding vehicles located closer than a second threshold from the subject vehicle, and wherein, at the process of (II), the processor, if the circumstance information corresponds to the second condition, instructs the correction module to (i) perform (i-1) a process of generating one or more image-based coordinates on a coordinate plane corresponding to the vehicle coordinate data representing one or more relative locations of the reference vehicles in relation to the subject vehicle by referring to the second reference data, and (i-2) a process of generating one or more communication-based coordinates on the coordinate plane representing one or more relative locations of surrounding vehicles of the V2V communication vehicles in relation to the subject vehicle by referring to the comparable data, and then to (ii) generate the second angle error by referring to the image-based coordinates and the communication-based coordinates, wherein N denotes the number of the V2V communication vehicles, and K denotes an integer from 1 to N.

As one example, at the process of (II), the processor, if the circumstance information corresponds to the second condition, instructs the correction module, by referring to information on a Field-Of-View (FOV) of the camera and the K-th specific comparable data acquired from the K-th specific V2V communication module, to (i) map the locations of said its K-th specific surrounding vehicles estimated by the K-th specific V2V communication vehicle onto the coordinate plane, to thereby generate one or more K-th initial coordinates, and (ii) generate the communication-based coordinates by referring to one or more first to one or more N-th initial coordinates including the K-th initial coordinates.

As one example, at the process of (II), the processor instructs the correction module to calculate at least one second difference angle between (i) at least one first specific direct line including at least one specific communication-based coordinate of at least one specific reference vehicle which is included in both of the reference vehicles and the surrounding vehicles, and an origin point of the coordinate plane and (ii) at least one second specific direct line including at least one specific image-based coordinate of at least one specific reference vehicle and the origin point of the coordinate plane, and output the second difference angle as the second angle error.

As one example, at the process of (II), the processor, if there are a plurality of (i) specific reference vehicles included in both of the reference vehicles and the surrounding vehicles, (ii) specific image-based coordinates corresponding to the specific reference vehicles and (iii) specific communication-based coordinates corresponding to the specific reference vehicles, generates the second angle error by referring to a following formula:

$$\text{second angle error} = \frac{1}{M}\sum_{k}^{M}\alpha_k \sin^{-1}\left(\frac{x_{i_k}y_{c_k} - y_{i_k}x_{c_k}}{\|(x_{i_k}, y_{i_k})\|\|(x_{c_k}, y_{c_k})\|}\right)$$

wherein M denotes the number of the specific reference vehicles, $(x_{i_k}, y_{i_k})$ denotes a K-th specific image-based coordinate of a K-th specific reference vehicle, $(x_{c_k}, y_{c_k})$ denotes a K-th specific communication-based coordinate thereof, and $\alpha_k$ denotes a weight assigned thereto.

As one example, at the process of (I), the processor, if driving information of the subject vehicle is acquired from a Controller Area Network (CAN) of the subject vehicle, determines whether the driving information corresponds to a condition A for a straight driving or a condition B for a non-straight driving, and instructs the first CNN or the second CNN to apply the first CNN operation or the second CNN operation to the reference image if the driving information corresponds to the condition A.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

FIG. 3 is a drawing schematically illustrating how a first angle error, to be used for correcting the misalignment of the camera by selectively using the information generated by itself and the information generated by other entities, is acquired, in accordance with one example embodiment of the present disclosure.

FIG. 4 is a drawing schematically illustrating how a second angle error, to be used for correcting the misalignment of the camera by selectively using the information generated by itself and the information generated by other entities, is acquired, in accordance with one example embodiment of the present disclosure.

DETAILED DESCRIPTION OF THE PREFERRED EMBODIMENTS

Figure 1:
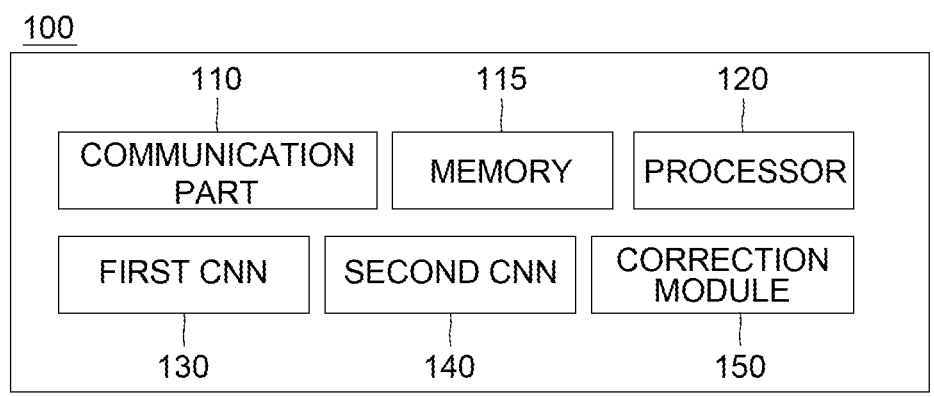
FIG. 1 is a drawing schematically illustrating a configuration of a computing device performing a method for correcting a misalignment of a camera by selectively using information generated by itself and information generated by other entities in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a configuration of a computing device performing a method for detecting and adjusting a misalignment of a camera through a cooperative diagnostic function using a V2V information fusion in accordance with one example embodiment of the present disclosure.

By referring to FIG. 1, the computing device may include a first Convolutional Neural Network (CNN) 130, a second CNN 140, and an correction module 150 to be described later. Processes of input/output and computations of the first CNN 130, the second CNN 140 and the correction module 150 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

So far the configuration of the computing device 100 performing the method for correcting the misalignment of the camera by selectively using the information generated by itself and the information generated by other entities in accordance with one example embodiment of the present disclosure has been explained. Below, the method itself will be explained.

Figure 2:
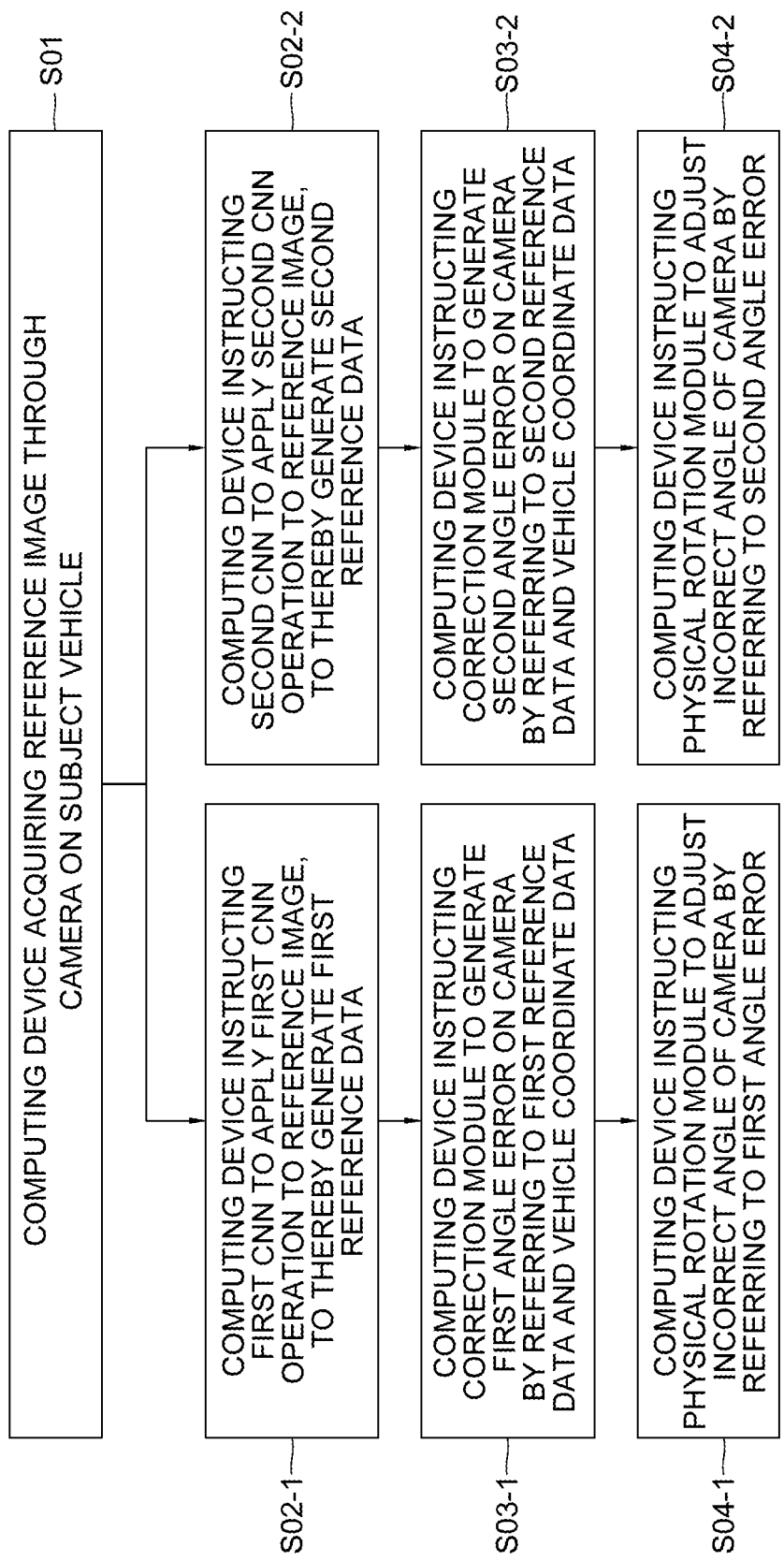
FIG. 2 is a drawing schematically illustrating a flow of the method for correcting the misalignment of the camera by selectively using the information generated by itself and the information generated by other entities in accordance with one example embodiment of the present disclosure.

FIG. 2 is a drawing schematically illustrating a flow of the method for correcting the misalignment of the camera by selectively using the information generated by itself and the information generated by other entities in accordance with one example embodiment of the present disclosure.

By referring to FIG. 2, at a step of 501, the computing device 100 may acquire at least one reference image through a camera on a subject vehicle. Thereafter, the computing device 100 may perform first processes corresponding to steps of S02-1, S03-1 and S04-1, if circumstance information of the subject vehicle to be explained later corresponds to a first condition. Otherwise, the computing device 100 may perform second processes corresponding to steps of S02-2, S03-2 and S04-2, if the circumstance information corresponds to a second condition. That is, the two kinds of processes, i.e., the first ones and the second ones illustrated in FIG. 2, may be selectively performed according to the circumstance information. However, it is possible for the two kinds of processes to be performed together in parallel, as the case may be.

Regarding the first processes, if the circumstance information corresponds to the first condition, at the step of S02-1, the computing device 100 may instruct the first CNN 130 to apply at least one first CNN operation to the reference image, to thereby generate first reference data including information on reference lanes of the reference image. And, at the step of S03-1, the computing device 100 may instruct the correction module 150 to generate at least one first angle error on the camera corresponding to the reference lanes by referring to the first reference data and vehicle coordinate data. Then, at the step of S04-1, the computing device 100 may instruct a physical rotation module (not illustrated) on the subject vehicle to adjust an incorrect angle of the camera by referring to the first angle error. Herein, the incorrect angle may have been caused unwantedly due to external factors like physical collisions on the camera.

Different from this, regarding the second processes, if the circumstance information corresponds to the second condition, at the step of S02-2, the computing device 100 may instruct the second CNN 140 to apply at least one second CNN operation to the reference image, to thereby generate second reference data including information on reference vehicles of the reference image. And, at the step of S03-2, the computing device 100 may instruct the correction module 150 to generate at least one second angle error on the camera corresponding to the reference vehicles by referring to the second reference data and the vehicle coordinate data. Then, at the step of S04-2, the computing device 100 may instruct the physical rotation module (not illustrated) on the subject vehicle to adjust the incorrect angle by referring to the second angle error.

So far the method of the present disclosure has been explained briefly. Below, it will be explained more specifically.

First, the circumstance information may include information on whether there are sufficient number of lanes around the subject vehicle or not, i.e., the number of the lanes being larger than a first threshold, and information on whether there are sufficient number of vehicles around the subject vehicle or not, i.e., the number of the vehicles being larger than a second threshold. Herein, the first condition of the circumstance information may denote a case when there are lanes more than the first threshold around the subject vehicle. To be explained later, the first processes are performed by using information on the reference lanes, thus the first condition of the circumstance information is necessary. Also, and the second condition of the circumstance information may denote a case when there are vehicles more than the second threshold around the subject vehicle. Also to be explained later, the second processes are performed by using information on the reference vehicles, thus the second condition of the circumstance information is necessary.

The circumstance information to be used as shown above may be acquired through many ways. As an example, other than the first CNN 130 and the second CNN 140, another neural network with a simpler structure may be included in the computing device 100 to acquire images around the subject vehicle and detect brief information on the surroundings of the subject vehicle. As another example, a location of the subject vehicle may be transmitted to a server, and the server may deliver the circumstance information thereof to the computing device 100. More simply, a passenger on the subject vehicle may just look around, and input the circumstance information to the computing device 100. Additionally, the circumstance information may correspond to both the first condition and the second condition. In this case, any one kind of processes among the first processes and the second processes may be selected randomly, or selected by said passenger.

Below, the first processes, which are based on said lanes around the subject vehicle, will be explained by referring to FIG. 3.

FIG. 3 is a drawing schematically illustrating how a first angle error, to be used for correcting the misalignment of the camera by selectively using the information generated by itself and the information generated by other entities, is acquired, in accordance with one example embodiment of the present disclosure.

By referring to FIG. 3, it can be seen that the computing device 100 generates the first angle error through the first CNN 130 and the correction module 150. Specifically, the computing device 100 may instruct at least one first convolutional layer 131 in the first CNN 130 to apply at least one first convolutional operation to the reference image, to thereby generate at least one first reference feature map. Then, the computing device 100 may instruct at least one first pooling layer 132 in the first CNN 130 to acquire first Region-Of-Interest information from a first Region Proposal Network (RPN) 134, and then to apply at least one first pooling operation to the first reference feature map, to thereby generate at least one first reference pooled feature map. Thereafter, the computing device 100 may instruct at least one first Fully-Connected (FC) layer 133 in the first CNN 130 to apply at least one first FC operation to the first reference pooled feature map, to thereby generate detection result on the reference lanes of the reference image as the first reference data. Said processes are similar to a well-known structure of "Faster R-CNN" used for detecting objects on an image, thus a person in the art may easily understand the above explanations.

Thereafter, the computing device 100 may instruct the correction module 150 to map the reference lanes onto a coordinate plane corresponding to the vehicle coordinate data. As an example, the vehicle coordinate data may include information on camera parameters of the camera on the subject vehicle. In this case, the reference lanes may be mapped onto the coordinate plane with the location of the subject vehicle in its origin point, by using a well-known image processing scheme using the camera parameter. Thereafter, the computing device 100 may find a specific reference lane 152, among the reference lanes, which is the closest from the subject vehicle, and may calculate a first difference angle between a prescribed reference axis 151 on the coordinate plane and the specific reference lane 152. The reference axis 151 may be an axis parallel to a straight line on the coordinate plane which is generated by setting a properly arranged lane parallel to the subject vehicle in an image photographed by the camera with an optimized angle. By calculating the first difference angle between the reference axis 151 and the specific reference lane 152, how incorrect an angle of the camera in a current state is in relation to the optimized angle may be calculated. The correction module 150 may output the first difference angle as the first angle error, and the computing device 100 may instruct the physical rotation module to adjust the angle of the camera by referring to the first angle error.

However, such first processes may be properly performed only if the subject vehicle is driving in parallel with lanes at a timing when the camera photographs the reference image. Accordingly, the computing device 100 may acquire driving information of the subject vehicle from a Controller Area Network (CAN) thereof, may determine whether the driving information corresponds to a condition A representing a situation that the subject vehicle drives straight continuously for a time of a third threshold or a condition B, which is opposite case of the condition A, and may instruct, if the driving information corresponds to the condition A, the first CNN 130 to apply the first CNN operation to the reference image in order to perform the first processes.

So far the first processes have been explained. Below, the second processes, which are based on locations of the vehicles around the subject vehicle, will be explained, by referring to FIG. 4.

FIG. 4 is a drawing schematically illustrating how a second angle error, to be used for correcting the misalignment of the camera by selectively using the information generated by itself and the information generated by other entities, is acquired, in accordance with one example embodiment of the present disclosure.

By referring to FIG. 4, it can be seen that the computing device 100 generates the second angle error through the second CNN 140 and the correction module 150. Specifically, the computing device 100 may instruct at least one second convolutional layer 141 in the second CNN 140 to apply at least one second convolutional operation to the reference image, to thereby generate at least one second reference feature map. Then, the computing device 100 may instruct at least one second pooling layer 142 in the second CNN 140 to acquire second Region-Of-Interest information from a second RPN 144, and then to apply at least one second pooling operation to the second reference feature map, to thereby generate at least one second reference pooled feature map. Thereafter, the computing device 100 may instruct at least one second FC layer 143 in the second CNN 140 to apply at least one second FC operation to the second reference pooled feature map, to thereby generate detection result on the reference vehicles of the reference image as the second reference data. Herein, the reference vehicles may be at least part of the vehicles around the subject vehicle which have been photographed on the reference image. As one example, if the camera has been installed to a front part of the subject vehicle, as shown in FIG. 4, a first reference vehicle 300, a second reference vehicle 400 and a third reference vehicle 500, which are located in front of the subject vehicle, may have been photographed as the reference vehicles.

In order to perform the second processes, other than the second reference data, one more kind of data, i.e., the comparable data, is needed. Such comparable data may be acquired from V2V communication vehicles, which are at least part of the vehicles around the subject vehicle 200. For convenience, it will be assumed that there are a first to an N-th V2V communication vehicles, and N is an integer same as or larger than 1.

To explain such an example of acquiring the comparable data from the multiple V2V communication vehicles, FIG. 4 will be referred to. By referring to FIG. 4, a K-th specific V2V communication vehicle 600 and an L-th specific V2V communication vehicle 700 can be seen. Herein, K and L may be integers from 1 to N. The K-th and the L-th specific V2V communication vehicles 600 and 700 may calculate locations of their surrounding vehicles, such as the subject vehicle 200, the first reference vehicle 300, the second reference vehicle 400 and the third reference vehicle 500, in case their cameras are installed to their front parts. The K-th and the L-th specific V2V communication vehicle 600 and 700 may calculate locations of their surrounding vehicles, i.e., the subject vehicle 200, the first reference vehicle 300, the second reference vehicle 400 and the third reference vehicle 500, as K-th specific comparable data and L-th specific comparable data, and then deliver those to the computing device 100 in the subject vehicle 200. By performing such processes, the comparable data including first to N-th specific comparable data can be acquired.

Thereafter, the computing device 100 may instruct the correction module 150 to generate each of two kinds of coordinates, i.e., image-based coordinates and communication-based coordinates, by referring to each of the second reference data and the comparable data. That is, the computing device 100 may instruct the correction module 150 to generate the image-based coordinates on the coordinate plane representing one or more relative locations of the reference vehicles in relation to the subject vehicle, by referring to the second reference data. Simply, the image-based coordinates may denote the locations of the reference vehicles estimated by using the camera in the current state with the incorrect angle. In parallel with the above process, the computing device 100 may instruct the correction module 150 to generate the communication-based coordinates on the coordinate plane representing one or more relative locations of the surrounding vehicles of the V2V communication vehicles in relation to the subject vehicle by referring to the comparable data. Such communication-based coordinates may denote the locations of the surrounding vehicles of the V2V communication vehicles estimated by the V2V communication vehicles, and may be used for being compared with the image-based coordinates.

How the communication-based coordinates are acquired will be explained more specifically by again referring to FIG. 4. The computing device 100 may instruct the correction module 150, by referring to information on a Field-Of-View (FOV) of the camera, the K-th specific comparable data and the L-th specific comparable data, to map the locations of K-th specific surrounding vehicles and L-th specific surrounding vehicles respectively located around the K-th specific V2V communication vehicle and the L-th specific V2V communication vehicle onto the coordinate plane, to thereby respectively generate one or more K-th initial coordinates and one or more L-th initial coordinates. As first to N-th initial coordinates are acquired, the computing device 100 may instruct the correction module 150 to merge each of the initial coordinates corresponding to each of the surrounding vehicles of the V2V communication vehicles, to thereby generate the communication-based coordinates. Herein, the first to the N-th initial coordinates may include the K-th initial coordinates and the L-th initial coordinates.

Herein, the K-th specific comparable data may include each of estimated coordinates of the subject vehicle 200, the first reference vehicle 300, the second reference vehicle 400 and the third reference vehicle 500, i.e., $(x_0^k, y_0^k)$, $(x_1^k, y_1^k)$, $(x_2^k, y_2^k)$ and $(x_3^k, y_3^k)$ respectively, and the L-th specific comparable data may include each of estimated coordinates of the subject vehicle 200, the first reference vehicle 300, the second reference vehicle 400 and the third reference vehicle 500, i.e., $(x_0^l, y_0^l)$, $(x_1^l, y_1^l)$, $(x_2^l, y_2^l)$ and $(x_3^l, y_3^l)$ respectively. Such estimated coordinates may be mapped onto the coordinate plane to become the K-th initial coordinates and the L-th initial coordinates. Since the origin point of the coordinate plane is the location of the subject vehicle 200, the K-th initial coordinates of the first to the third reference vehicles 300, 400 and 500 may be calculated by subtracting an estimated coordinate of the subject vehicle 200 from estimated coordinates of the first to the third reference vehicles 300, 400 and 500, and the L-th initial coordinates may be calculated in a similar way. Thus, the K-th initial coordinates for the first to the third reference vehicles 300, 400 and 500 may be calculated as $(x_1^k-x_0^k, y_1^k-y_0^k)$, $(x_2^k-x_0^k, y_2^k-y_0^k)$, and $(x_3^k-x_0^k, y_3^k-y_0^k)$, and the L-th initial coordinates therefor may be calculated as $(x_1^l-x_0^l, y_1^l-y_0^l)$, $(x_2^l-x_0^l, y_2^l-y_0^l)$, and $(x_3^l-x_0^l, y_3^l-y_0^l)$.

Thereafter, some of the communication-based coordinates, i.e., specific communication-based coordinates, for the first to the third reference vehicles 300, 400 and 500 may be generated by merging some of the initial coordinates, i.e., specific initial coordinates, corresponding to the first to the third reference vehicles 300, 400 and 500. How said specific initial coordinates are merged will be explained below, under an assumption that there are only the K-th initial coordinates and the L-th initial coordinates which correspond to the first to the third reference vehicles 300, 400 and 500.

Simply, the specific part of the communication-based coordinates for the first to the third reference vehicles 300, 400 and 500 may be calculated as $$\left(\frac{x_1^k-x_0^k}{2}+\frac{x_1^l-x_0^l}{2}, \frac{y_1^k-y_0^k}{2}+\frac{y_1^l-y_0^l}{2}\right),$$

$$\left(\frac{x_2^k-x_0^k}{2}+\frac{x_2^l-x_0^l}{2}, \frac{y_2^k-y_0^k}{2}+\frac{y_2^l-y_0^l}{2}\right) \text{ and}$$

$$\left(\frac{x_1^k-x_0^k}{2}+\frac{x_1^l-x_0^l}{2}, \frac{y_1^k-y_0^k}{2}+\frac{y_1^l-y_0^l}{2}\right),$$

by averaging each of pairs of each of the K-th initial coordinates and each of the L-th initial coordinates corresponding to each of the first to the third reference vehicles 300, 400 and 500. In this embodiment, a simple scheme of averages is used, but other more complex schemes such as weighted averages or other schemes may be used.

After the communication-based coordinates are generated, the computing device 100 may generate the second angle error by referring to the image-based coordinates and their corresponding communication-based coordinates. Specifically, the computing device 100 may instruct the correction module 150 to calculate at least one second difference angle between (i) at least one first specific direct line including at least one specific communication-based coordinate of at least one specific reference vehicle which is included in both of the reference vehicles and the surrounding vehicles, and the origin point of the coordinate plane and (ii) at least one second specific direct line including at least one specific image-based coordinate of at least one specific reference vehicle and the origin point of the coordinate plane, and output the second difference angle as the second angle error. To explain a case that there are a plurality of specific reference vehicles, and accordingly a plurality of specific communication-based coordinates and specific image-based coordinates, FIG. 4 will be again referred to.

By referring to FIG. 4, a first, a second and a third specific communication-based coordinates 301, 401 and 501 and a first, a second and a third specific image-based coordinates 302, 402 and 502 for the first, the second and the third reference vehicles 300, 400 and 500 may be seen, and it may be seen that difference angles $\theta_1$, $\theta_2$ and $\theta_3$ between first lines including the first, the second and the third specific communication-based coordinates and second lines including the first, the second and the third specific image-based coordinates are calculated. The second angle error may be calculated as an average of the difference angles.

The above processes may be generalized as a following formula:

$$\text{second angle error} = \frac{1}{M}\sum_{k}^{M} \alpha_k \sin^{-1}\left(\frac{x_{i_k} y_{c_k} - y_{i_k} x_{c_k}}{\|(x_{i_k}, y_{i_k})\| \|(x_{c_k}, y_{c_k})\|}\right)$$

Herein, M may denote the number of the specific reference vehicles which are included in both of the reference vehicles and the surrounding vehicles of the V2V communication vehicles, and $(x_{i_k}, y_{i_k})$ may denote a K-th specific image-based coordinate of a K-th specific reference vehicle. Also, $(x_{c_k}, y_{c_k})$ may denote a K-th specific communication-based coordinate thereof, and $\alpha_k$ may denote a weight for the K-th specific reference vehicle.

The second processes explained so far may be performed when a difference between a timing of the reference image being acquired and a timing of the comparable data being generated is smaller than a fourth threshold. Also, an accuracy of the second processes may be dropped when the subject vehicle is not driving straight, thus the second processes, similar to the first processes, may be performed when the driving information of the subject vehicle corresponds to the condition A for the straight driving.

The present disclosure has an effect of providing It is a method for detecting and adjusting a misalignment of a camera by selectively using information generated by itself and information generated by other entities, to thereby reduce dangers of autonomous driving caused by external factors.

The present disclosure has another effect of providing a method for integrating each of pieces of said information generated by each of other vehicles to generate comparable data to be compared with the information generated by itself, to thereby correct the misalignment of the camera.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for correcting an incorrect angle of an unwantedly yawed camera on a subject vehicle by using at least part of primary information generated by the subject vehicle itself and secondary information generated by other entities, wherein at least one of the primary information and the secondary information is selected by referring to circumstance information on surroundings of the subject vehicle, to be used for correcting the incorrect angle, comprising steps of:
    (a) a computing device, if at least one reference image is acquired through a camera on the subject vehicle, performing, (i) a process of instructing, if the circumstance information corresponds to a first condition related to lanes on roads, a first Convolutional Neural Network (CNN) to apply at least one first CNN operation to the reference image, to thereby generate first reference data including information on reference lanes of the reference image, and (ii) a process of instructing, if the circumstance information corresponds to a second condition related to other vehicles on the roads, a second CNN to apply at least one second CNN operation to the reference image, to thereby generate second reference data including information on one or more reference vehicles of the reference image;
    (b) the computing device instructing a correction module to perform (i) a process of generating, if the circumstance information corresponds to the first condition, at least one first angle error on the camera corresponding to the reference lanes by referring to the first reference data and vehicle coordinate data, and (ii) a process of generating, if the circumstance information corresponds to the second condition, at least one second angle error on the camera corresponding to the reference vehicles by referring to the second reference data and the vehicle coordinate data; and
    (c) the computing device instructing a physical rotation module on the subject vehicle to perform (i) a process of adjusting, if the circumstance information corresponds to the first condition, the incorrect angle by referring to the first angle error corresponding to the reference lanes and (ii) a process of adjusting, if the circumstance information corresponds to the second condition, the incorrect angle by referring to the second angle error corresponding to the reference vehicles.

2. The method of claim 1, wherein, at the step of (a), the computing device, if the circumstance information corresponds to the first condition, (i) instructs at least one first convolutional layer in the first CNN to apply at least one first convolutional operation to the reference image, to thereby generate at least one first reference feature map, (ii) instructs at least one first pooling layer in the first CNN to apply at least one first pooling operation to the first reference feature map, to thereby generate at least one first reference pooled feature map, and (iii) instructs at least one first Fully-Connected (FC) layer in the first CNN to apply at least one first FC operation to the first reference pooled feature map, to thereby generate detection result on the reference lanes of the reference image as the first reference data.

3. The method of claim 2, wherein, at the step of (b), the computing device, if the circumstance information corresponds to the first condition, instructs the correction module to (i) map the reference lanes onto a coordinate plane corresponding to the vehicle coordinate data, by referring to the vehicle coordinate data, (ii) calculate at least one first difference angle between a reference axis on the coordinate plane and at least one of the reference lanes, and (iii) output the first difference angle as the first angle error.

4. The method of claim 1, wherein, at the step of (a), the computing device, if the circumstance information corresponds to the second condition, (i) instructs at least one second convolutional layer in the second CNN to apply at least one second convolutional operation to the reference image, to thereby generate at least one second reference feature map, (ii) instructs at least one second pooling layer in the second CNN to apply at least one second pooling operation to the second reference feature map, to thereby generate at least one second reference pooled feature map, and (iii) instructs at least one second Fully-Connected (FC) layer in the second CNN to apply at least one second FC operation to the second reference pooled feature map, to thereby generate detection result on the reference vehicles of the reference image as the second reference data.

5. The method of claim 4, wherein, at the step of (a), the computing device, if the circumstance information corresponds to the second condition, in parallel with said process of generating the second reference data, acquires comparable data from one or more V2V communication vehicles located closer than a first threshold from the subject vehicle by performing wireless communications with the V2V communication vehicles,
    wherein K-th specific comparable data, among the comparable data, acquired from a K-th specific V2V communication vehicle among a first to an N-th specific V2V communication vehicles in the V2V communication vehicles, includes information, generated by the K-th specific V2V communication vehicle, on locations of its K-th specific surrounding vehicles located closer than a second threshold from the subject vehicle, and
    wherein, at the step of (b), the computing device, if the circumstance information corresponds to the second condition, instructs the correction module to (i) perform (i-1) a process of generating one or more image-based coordinates on a coordinate plane corresponding to the vehicle coordinate data representing one or more relative locations of the reference vehicles in relation to the subject vehicle by referring to the second reference data, and (i-2) a process of generating one or more communication-based coordinates on the coordinate plane representing one or more relative locations of surrounding vehicles of the V2V communication vehicles in relation to the subject vehicle by referring to the comparable data, and then to (ii) generate the second angle error by referring to the image-based coordinates and the communication-based coordinates, wherein N denotes the number of the V2V communication vehicles, and K denotes an integer from 1 to N.

6. The method of claim 5, wherein, at the step of (b), the computing device, if the circumstance information corresponds to the second condition, instructs the correction module, by referring to information on a Field-Of-View (FOV) of the camera and the K-th specific comparable data acquired from the K-th specific V2V communication module, to (i) map the locations of said its K-th specific surrounding vehicles estimated by the K-th specific V2V communication vehicle onto the coordinate plane, to thereby generate one or more K-th initial coordinates, and (ii) generate the communication-based coordinates of the surrounding vehicles by referring to one or more first to one or more N-th initial coordinates including the K-th initial coordinates.

7. The method of claim 5, wherein, at the step of (b), the computing device instructs the correction module to calculate at least one second difference angle between (i) at least one first specific direct line including at least one specific communication-based coordinate of at least one specific reference vehicle which is included in both of the reference vehicles and the surrounding vehicles, and an origin point of the coordinate plane and (ii) at least one second specific direct line including at least one specific image-based coordinate of at least one specific reference vehicle and the origin point of the coordinate plane, and output the second difference angle as the second angle error.

8. The method of claim 7, wherein, at the step of (b), the computing device, if there are a plurality of (i) specific reference vehicles included in both of the reference vehicles and the surrounding vehicles, (ii) specific image-based coordinates corresponding to the specific reference vehicles and (iii) specific communication-based coordinates corresponding to the specific reference vehicles, generates the second angle error by referring to a following formula:

$$\text{second angle error} = \frac{1}{M}\sum_{k}^{M} \alpha_k \sin^{-1}\left(\frac{x_{i_k} y_{c_k} - y_{i_k} x_{c_k}}{\|(x_{i_k}, y_{i_k})\| \|(x_{c_k}, y_{c_k})\|}\right)$$

wherein M denotes the number of the specific reference vehicles, $(x_{i_k}, y_{i_k})$ denotes a K-th specific image-based coordinate of a K-th specific reference vehicle, $(x_{c_k}, y_{c_k})$ denotes a K-th specific communication-based coordinate thereof, and $\alpha_k$ denotes a weight assigned thereto.

9. The method of claim 1, wherein, at the step of (a), the computing device, if driving information of the subject vehicle is acquired from a Controller Area Network (CAN) of the subject vehicle, determines whether the driving information corresponds to a condition A for a straight driving or a condition B for a non-straight driving, and instructs the first CNN or the second CNN to apply the first CNN operation or the second CNN operation to the reference image if the driving information corresponds to the condition A.

10. A computing device for correcting an incorrect angle of an unwantedly yawed camera on a subject vehicle by using at least part of primary information generated by the subject vehicle itself and secondary information generated by other entities, wherein at least one of the primary information and the secondary information is selected by referring to circumstance information on surroundings of the subject vehicle, to be used for correcting the incorrect angle, comprising:

at least one memory that stores instructions; and
at least one processor configured to execute the instructions to perform processes of: (I) if at least one reference image is acquired through a camera on the subject vehicle, instructing, if the circumstance information corresponds to a first condition related to lanes on roads, a first Convolutional Neural Network (CNN) to apply at least one first CNN operation to the reference image, to thereby generate first reference data including information on reference lanes of the reference image, and instructing, if the circumstance information corresponds to a second condition related to other vehicles on the roads, a second CNN to apply at least one second CNN operation to the reference image, to thereby generate second reference data including information on one or more reference vehicles of the reference image; (II) instructing an correction module to generate, if the circumstance information corresponds to the first condition, at least one first angle error on the camera corresponding to the reference lanes by referring to the first reference data and vehicle coordinate data, and generate, if the circumstance information corresponds to the second condition, at least one second angle error on the camera corresponding to the reference vehicles by referring to the second reference data and the vehicle coordinate data; and (III) instructing a physical rotation module on the subject vehicle to adjust, if the circumstance information corresponds to the first condition, the incorrect angle by referring to the first angle error corresponding to the reference lanes and adjust, if the circumstance information corresponds to the second condition, the incorrect angle by referring to the second angle error corresponding to the reference vehicles.

11. The device of claim 10, wherein, at the process of (I), the processor, if the circumstance information corresponds to the first condition, (i) instructs at least one first convolutional layer in the first CNN to apply at least one first convolutional operation to the reference image, to thereby generate at least one first reference feature map, (ii) instructs at least one first pooling layer in the first CNN to apply at least one first pooling operation to the first reference feature map, to thereby generate at least one first reference pooled feature map, and (iii) instructs at least one first Fully-Connected (FC) layer in the first CNN to apply at least one first FC operation to the first reference pooled feature map, to thereby generate detection result on the reference lanes of the reference image as the first reference data.

12. The device of claim 11, wherein, at the process of (II), the processor, if the circumstance information corresponds to the first condition, instructs the correction module to (i) map the reference lanes onto a coordinate plane corresponding to the vehicle coordinate data, by referring to the vehicle coordinate data, (ii) calculate at least one first difference angle between a reference axis on the coordinate plane and at least one of the reference lanes, and (iii) output the first difference angle as the first angle error.

13. The device of claim 10, wherein, at the process of (I), the processor, if the circumstance information corresponds to the second condition, (i) instructs at least one second convolutional layer in the second CNN to apply at least one second convolutional operation to the reference image, to thereby generate at least one second reference feature map, (ii) instructs at least one second pooling layer in the second CNN to apply at least one second pooling operation to the second reference feature map, to thereby generate at least one second reference pooled feature map, and (iii) instructs at least one second Fully-Connected (FC) layer in the second CNN to apply at least one second FC operation to the second reference pooled feature map, to thereby generate detection result on the reference vehicles of the reference image as the second reference data.

14. The device of claim 13, wherein, at the process of (I), the processor, if the circumstance information corresponds to the second condition, in parallel with said process of generating the second reference data, acquires comparable data from one or more V2V communication vehicles located closer than a first threshold from the subject vehicle by performing wireless communications with the V2V communication vehicles,
wherein K-th specific comparable data, among the comparable data, acquired from a K-th specific V2V communication vehicle among a first to an N-th specific V2V communication vehicles in the V2V communication vehicles, includes information, generated by the K-th specific V2V communication vehicle, on locations of its K-th specific surrounding vehicles located closer than a second threshold from the subject vehicle, and
wherein, at the process of (II), the processor, if the circumstance information corresponds to the second condition, instructs the correction module to (i) perform (i-1) a process of generating one or more image-based coordinates on a coordinate plane corresponding to the vehicle coordinate data representing one or more relative locations of the reference vehicles in relation to the subject vehicle by referring to the second reference data, and (i-2) a process of generating one or more communication-based coordinates on the coordinate plane representing one or more relative locations of surrounding vehicles of the V2V communication vehicles in relation to the subject vehicle by referring to the comparable data, and then to (ii) generate the second angle error by referring to the image-based coordinates and the communication-based coordinates,
wherein N denotes the number of the V2V communication vehicles, and K denotes an integer from 1 to N.

15. The device of claim 14, wherein, at the process of (II), the processor, if the circumstance information corresponds to the second condition, instructs the correction module, by referring to information on a Field-Of-View (FOV) of the camera and the K-th specific comparable data acquired from the K-th specific V2V communication module, to (i) map the locations of said its K-th specific surrounding vehicles estimated by the K-th specific V2V communication vehicle onto the coordinate plane, to thereby generate one or more K-th initial coordinates, and (ii) generate the communication-based coordinates of the surrounding vehicles by referring to one or more first to one or more N-th initial coordinates including the K-th initial coordinates.

16. The device of claim 14, wherein, at the process of (II), the processor instructs the correction module to calculate at least one second difference angle between (i) at least one first specific direct line including at least one specific communication-based coordinate of at least one specific reference vehicle which is included in both of the reference vehicles and the surrounding vehicles, and an origin point of the coordinate plane and (ii) at least one second specific direct line including at least one specific image-based coordinate of at least one specific reference vehicle and the origin point of the coordinate plane, and output the second difference angle as the second angle error.

17. The device of claim 16, wherein, at the process of (II), the processor, if there are a plurality of (i) specific reference vehicles included in both of the reference vehicles and the surrounding vehicles, (ii) specific image-based coordinates corresponding to the specific reference vehicles and (iii) specific communication-based coordinates corresponding to the specific reference vehicles, generates the second angle error by referring to a following formula:

$$\text{second angle error} = \frac{1}{M}\sum_{k}^{M} \alpha_k \sin^{-1}\left(\frac{x_{i_k} y_{c_k} - y_{i_k} x_{c_k}}{\|(x_{i_k}, y_{i_k})\|\|(x_{c_k}, y_{c_k})\|}\right)$$

wherein M denotes the number of the specific reference vehicles, $(x_{i_k}, y_{i_k})$ denotes a K-th specific image-based coordinate of a K-th specific reference vehicle, $(x_{c_k}, y_{c_k})$ denotes a K-th specific communication-based coordinate thereof, and $\alpha_k$ denotes a weight assigned thereto.

18. The device of claim 10, wherein, at the process of (I), the processor, if driving information of the subject vehicle is acquired from a Controller Area Network (CAN) of the subject vehicle, determines whether the driving information corresponds to a condition A for a straight driving or a condition B for a non-straight driving, and instructs the first CNN or the second CNN to apply the first CNN operation or the second CNN operation to the reference image if the driving information corresponds to the condition A.

* * * * *